(12) United States Patent
Sentoku (10) Patent No.: US 7,497,131 B2
(45) Date of Patent: Mar. 3, 2009

(54) SENSOR-MOUNTED ROLLER BEARING APPARATUS

(75) Inventor: Minoru Sentoku, Kashiba (JP)

(73) Assignee: Jtekt Corporation, Osaka (JP)

( * ) Notice: Subject to any disclaimer, the term of this patent is extended or adjusted under 35 U.S.C. 154(b) by 44 days.

(21) Appl. No.: 11/282,774

(22) Filed: Nov. 21, 2005

(65) Prior Publication Data

US 2006/0107765 A1  May 25, 2006

(30) Foreign Application Priority Data

Nov. 22, 2004 (JP) ............................. 2004-337905
Nov. 22, 2004 (JP) ............................. 2004-337931

(51) Int. Cl.
G01L 3/14 (2006.01)
(52) U.S. Cl. .................................. 73/862.322
(58) Field of Classification Search ............ 73/862.322, 73/593
See application file for complete search history.

(56) References Cited

U.S. PATENT DOCUMENTS

| | | | | |
|---|---|---|---|---|
| 3,589,747 A | * | 6/1971 | Asberg ........................ | 280/105 |
| 3,745,819 A | * | 7/1973 | Earl ........................ | 73/862.49 |
| 4,117,719 A | * | 10/1978 | Schutz .................. | 73/862.541 |
| 4,168,160 A | * | 9/1979 | Stoferle et al. ............ | 73/862.49 |
| 5,009,523 A | * | 4/1991 | Folger et al. ................ | 384/475 |
| 5,677,488 A | | 10/1997 | Monahan et al. | |
| 6,343,878 B1 | * | 2/2002 | Ouchi ........................ | 384/448 |
| 6,471,407 B1 | * | 10/2002 | Katano ........................ | 384/448 |
| 6,535,135 B1 | * | 3/2003 | French et al. ................ | 340/682 |
| 6,619,849 B2 | * | 9/2003 | Katano ........................ | 384/448 |
| 6,830,379 B2 | * | 12/2004 | Morita et al. ................ | 384/448 |
| 6,920,801 B2 | * | 7/2005 | Van Leeuwen et al. ... | 73/862.49 |
| 7,014,368 B2 | * | 3/2006 | Morita et al. ................ | 384/448 |
| 7,116,095 B2 | * | 10/2006 | Takizawa et al. ............ | 324/174 |
| 2006/0278022 A1 | * | 12/2006 | Ono ........................ | 73/862.322 |

FOREIGN PATENT DOCUMENTS

| | | |
|---|---|---|
| DE | 198 31 270 A1 | 1/2000 |
| DE | 101 36 438 A1 | 3/2002 |
| DE | 100 61 923 A1 | 6/2002 |
| EP | 0 432 122 A2 | 6/1991 |
| EP | 0 668 491 A2 | 8/1995 |
| JP | 6-34454 A | 2/1994 |
| JP | 9-49702 A | 2/1997 |
| JP | 2003-246201 A | 9/2003 |
| JP | 2003-530565 A | 10/2003 |
| WO | WO-94/21480 A1 | 9/1994 |
| WO | WO-01/77634 A2 | 10/2001 |

* cited by examiner

*Primary Examiner*—Harshad Patel
*Assistant Examiner*—Octavia Davis
(74) *Attorney, Agent, or Firm*—Birch, Stewart, Kolasch & Birch, LLP (57) ABSTRACT

A roller bearing apparatus having a fixed bearing ring, a rotary bearing ring, and rolling elements rollably provided between the bearing rings. Piezoelectric elements are provided in the form of a film interposed between the fixed bearing ring and a fixing part to which the fixed bearing ring is fixed so as to detect loads applied between the fixed bearing ring and the fixing part.

17 Claims, 7 Drawing Sheets

SENSOR-MOUNTED ROLLER BEARING APPARATUS

BACKGROUND OF THE INVENTION

The present invention relates to a sensor-mounted roller bearing apparatus in which sensors are installed.

Among roller bearing apparatus, sensor-mounted roller bearing apparatus are provided with sensors for detecting operation data such as loads in the course of bearing rotation besides their original bearing function. For example, Japanese Patent Publication of No. 2003-530565 describes a bearing apparatus applied to the bearing hub unit of a vehicle in which multiple sensor modules having strain gauges attached to the surface of a housing surrounding a bearing ring are provided and loads are detected based on the sensing results from the modules. Japanese Unexamined Patent Application No. 2003-246201 describes a bearing apparatus applied to the bearing hub unit of a vehicle in which strain gauges are attached to the mounting flange of an inner ring (a rotary bearing ring) to detect loads applied to the bearing apparatus.

The bearing apparatus described in Japanese Patent Publication No. 2003-530565 detects loads based on the piezo-resistance effect of strain gauges. Therefore, a dedicated bridge circuit has to be connected to each strain gauge. The resistance of a strain gauge is easily affected by changes in temperature such as the ambient temperature. It is therefore required to compensate for temperature drifts of the gauge resistor by providing a temperature compensation plate near each gauge for accurate load detection. Consequently, it is difficult in this prior art apparatus to reduce the number of parts and simplify the structure.

On the other hand, the bearing apparatus described in Japanese Unexamined Patent Application No. 2003-246201 has strain gauges attached to the mounting flange of the rotary bearing ring. A radio transmitter or a slip ring must be provided to output detection signals from the strain gauges to a control apparatus, which complicates the structure of the bearing apparatus. In this prior art bearing apparatus, through-holes are formed in the mounting flange and the strain gauges are attached to the surface of the through-holes so that the mounting flange is easily deformed (distorted) for accurate load detection, hampering attempts to simplify the assembly of the load sensor.

SUMMARY OF THE INVENTION

In view of the aforementioned problems, the purpose of the present invention is to provide a sensor-mounted roller bearing apparatus that allows for accurate load detection using a smaller number of parts and that has a simplified structure.

The sensor-mounted roller bearing apparatus according to the first aspect of the present invention is a roller bearing apparatus including a bearing having a fixed bearing ring, a rotary bearing ring, and rolling elements rollably provided between the bearing rings, wherein the apparatus is provided with piezoelectric elements in the form of a film interposed between the fixed bearing ring and the fixing part to which the fixed bearing ring is fixed so as to detect loads applied between the fixed bearing ring and the fixing part.

The sensor-mounted roller bearing apparatus having the structure above uses piezoelectric elements interposed between the fixed bearing ring and a fixing part to be fixed thereto to detect loads applied between the fixed bearing ring and the fixing part. Therefore, unlike the aforementioned prior art, the loads can be detected with high accuracy without providing a bridge circuit and the like. Further, the piezoelectric elements are in the form of a film, and the piezoelectric elements can be easily mounted on the curved surface, simplifying their installation.

In the above sensor-mounted roller bearing apparatus, the piezoelectric elements can be interposed between the fixing part and a flange formed on the outer or inner periphery of the fixed bearing ring to detect axially applied loads to the bearing.

In such a case, the axial loads can be detected with high accuracy while reducing the number of parts.

In the above sensor-mounted roller bearing apparatus, the piezoelectric elements can be interposed between the fixing part and the outer or inner periphery of the fixed bearing ring to detect loads radially applied to the bearing.

In such a case, the radial loads can be accurately detected with high accuracy while reducing the number of parts.

It is preferable in the above sensor-mounted roller bearing apparatus that the fixed bearing ring consists of an outer ring having a flange that is fixed to an annular knuckle included in a suspension of a vehicle; that four of the piezoelectric elements are interposed between the axial end surface of the outer ring flange and the axial end surface of the knuckle at intervals of 90° around the bearing axis to detect axially applied loads on the bearing; and that four of the piezoelectric elements are interposed between the outer periphery of the outer ring and the inner periphery of the knuckle at intervals of 90° around the bearing axis to detect loads radially applied on the bearing.

In such a case, four piezoelectric elements are provided in the axial and radial directions of the bearing, respectively, at intervals of 90° around the bearing axis. When the bearing apparatus is mounted on the suspension, axial and radial loads in the longitudinal and vertical directions of a vehicle can be detected and the behavior of the vehicle at each wheel where the bearing apparatus is mounted can be detected.

The sensor-mounted roller bearing apparatus according to the second aspect of the present invention is a roller bearing apparatus having a fixed bearing ring, a rotary bearing ring, and rolling elements rollably provided between the bearing rings, wherein load sensors for detecting loads applied between the fixed bearing ring and a fixing part to which the fixed bearing ring is fixed are provided on a fixing means that fixes the fixed bearing ring and the fixing part.

The sensor-mounted roller bearing apparatus having the above structure has load sensors provided on a fixing means that fixes the fixed bearing ring and a fixing part to be fixed thereto, the load sensors being used to detect loads applied between the fixed bearing ring and the fixing part. Unlike the prior art, the loads can be detected with high accuracy without providing a wireless transmitter and the like. Further, because the load sensors are provided on the fixing means, the load sensors can be installed when the fixed bearing ring and fixing part are fixed by the fixing means.

In the above sensor-mounted roller bearing apparatus, the load sensors may consist of two strain gauges connected to each other in series so that the load sensors can detect strain generated in the fixing means depending on the load, and of the detected flexural and tensile strain components, one strain component is canceled and only the other strain component is detected.

Of the flexural and tensile components, only one component remaining after cancellation is emphasized and detected. Therefore, highly accurate load detection can be easily realized.

It is preferable in the above sensor-mounted roller bearing apparatus that the load sensors are piezoelectric elements built in the fixing means or attached to the surface of the fixing means in a manner in which they are interposed between the fixing means and the fixing part and supply signals depending on the load.

In such a case, the load can be directly detected using the piezoelectric effect of the piezoelectric element. Unlike using strain gauges, the load can be detected without providing bridge circuits, reducing the number of parts and further simplifying the apparatus structure.

It is preferable in the above sensor-mounted roller bearing apparatus that the fixed bearing ring consists of an outer ring having a flange that is fixed to an annular knuckle included in the suspension of a vehicle; and the fixing means consists of multiple fixing bolts that fix the knuckle and the flange at respectively differing pre-determined positions around the bearing axis.

In such a case, multiple load sensors are provided at different points around the bearing axis. When the bearing apparatus is mounted on the suspension, the multiple load sensors are provided at different points around the wheel axle where the bearing is mounted and detect load components in the longitudinal, vertical, and transverse directions of the vehicle. The behavior of the vehicle at each wheel can be detected with high accuracy.

DETAILED DESCRIPTION

Preferred embodiments of the sensor-mounted roller bearing apparatus (occasionally simply referred to bearing apparatus hereafter) of the present invention are described hereafter with reference to the drawings. In the following explanation, the present invention is applied to a driven wheel hub unit of a vehicle by way of example.

Figure 1:
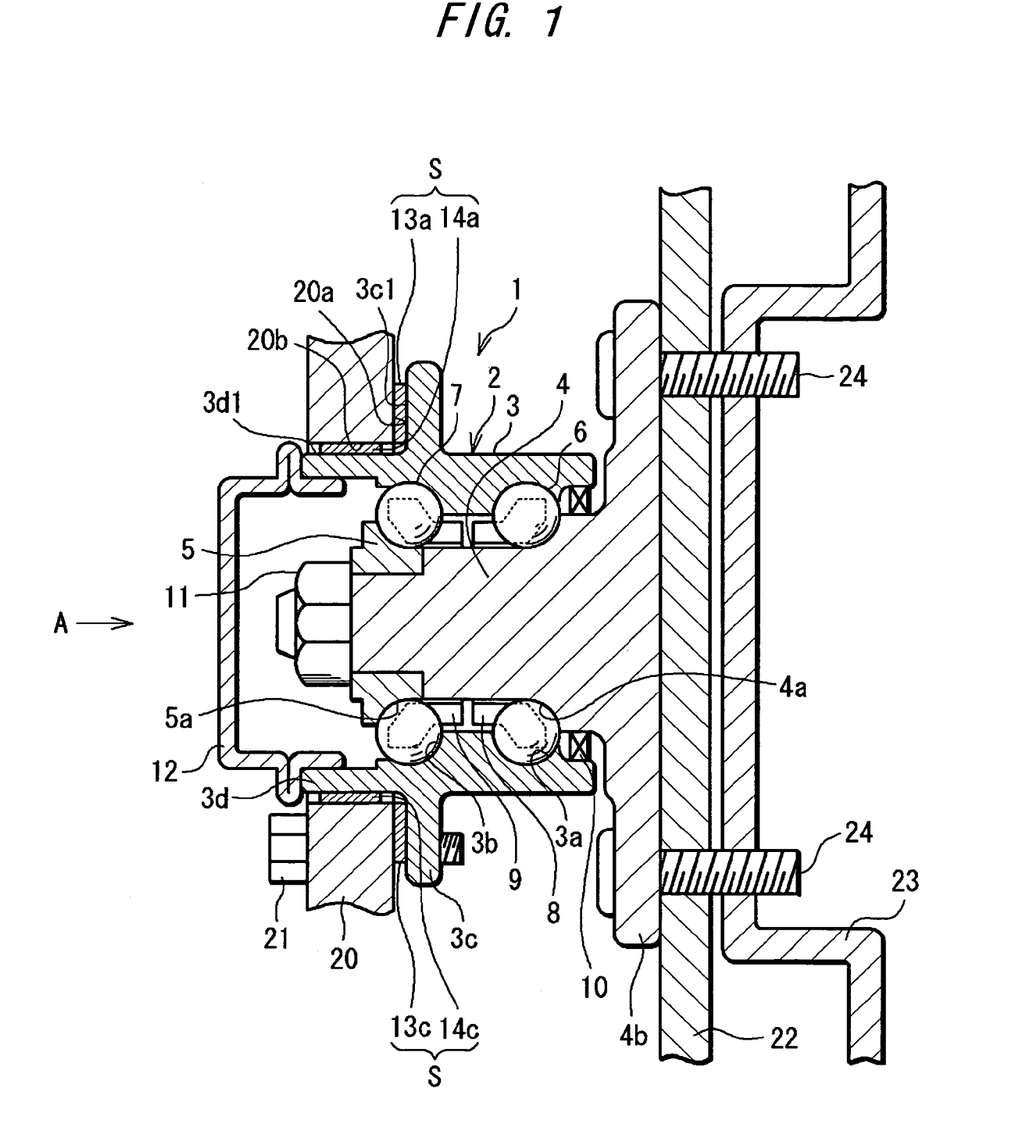
FIG. 1 is a cross-sectional view of an embodiment of the sensor-mounted roller bearing apparatus according to the first aspect of the present invention.

FIG. 1 is a cross-sectional view of an embodiment of the bearing apparatus according to the first aspect of the present invention. FIG. 1 shows the outer side (wheel side) of the vehicle to the right and the inner side of the vehicle to the left. A bearing apparatus 1 of this embodiment is composed of a roller bearing apparatus 2 and a sensor device S. The roller bearing apparatus 2 is of a double-row angular ball bearing type and comprises an outer ring 3, an inner shaft (hub) 4, an inner ring 5, and rolling elements, or multiple balls, 6 and 7. The roller bearing apparatus 2 also comprises cages 8 and 9 that hold the rolling elements 6 and 7 at specified intervals in the circumferential direction, a seal 10 provided in the gap between the outer ring 3 and the inner shaft 4, and a nut 11 screwed in the inner shaft 4.

The outer ring 3 is a fixed bearing ring that is fixed to the vehicle body, having a double row of races $3a$ and $3b$. On the other hand, a rotary bearing ring is formed by the inner shaft 4 and the inner ring 5. A race $4a$ is formed on the inner shaft 4 at the corresponding point to the race $3a$, by which the rolling element 6 rolls between the races $3a$ and $4a$. A race $5a$ is formed on the inner ring 5 at the corresponding point to the race $3b$, by which the rolling element 7 rolls between the races $3b$ and $5a$.

The outer ring 3 has a flange $3c$ formed on the vehicle inner side and on the diametrically outer side and a cylindrical part $3d$ axially extended on the vehicle inner side. An annular knuckle 20 as a fixing part included in the aforementioned vehicle suspension (not shown) is fixed to the flange $3c$ and cylindrical part $3d$ by bolts 21. Pressed in the inner periphery of the cylindrical part $3d$, a cover 12 seals the annular opening between the outer and inner rings of the roller bearing apparatus 2 on the vehicle inner side to prevent rain and foreign substances from entering the bearing in conjunction with the seal 10 that seals the annular opening on the vehicle outer side.

Piezoelectric elements $13a$, $13c$, $14a$, and $14c$ included in the sensor apparatus S are attached between the knuckle 20 and the flange and cylindrical parts $3c$ and $3d$ as described later.

The inner shaft 4 has a flange $4b$ formed at the vehicle outer side end and on the diametrically outer side. A disc rotor 22 and a wheel 23 included in the brake apparatus of the vehicle are fixed to the flange $4b$ in order by bolts 24 pressed in and fixed to the flange $4b$.

The inner ring 5 is fixed to the inner shaft 4 by fastening the nut 11 screwed in the inner shaft 4 at the vehicle inner side end.

The sensor device S is used to detect loads applied to the roller bearing apparatus 2, and can separately measure the axial and radial loads of the bearing.

Figure 2:
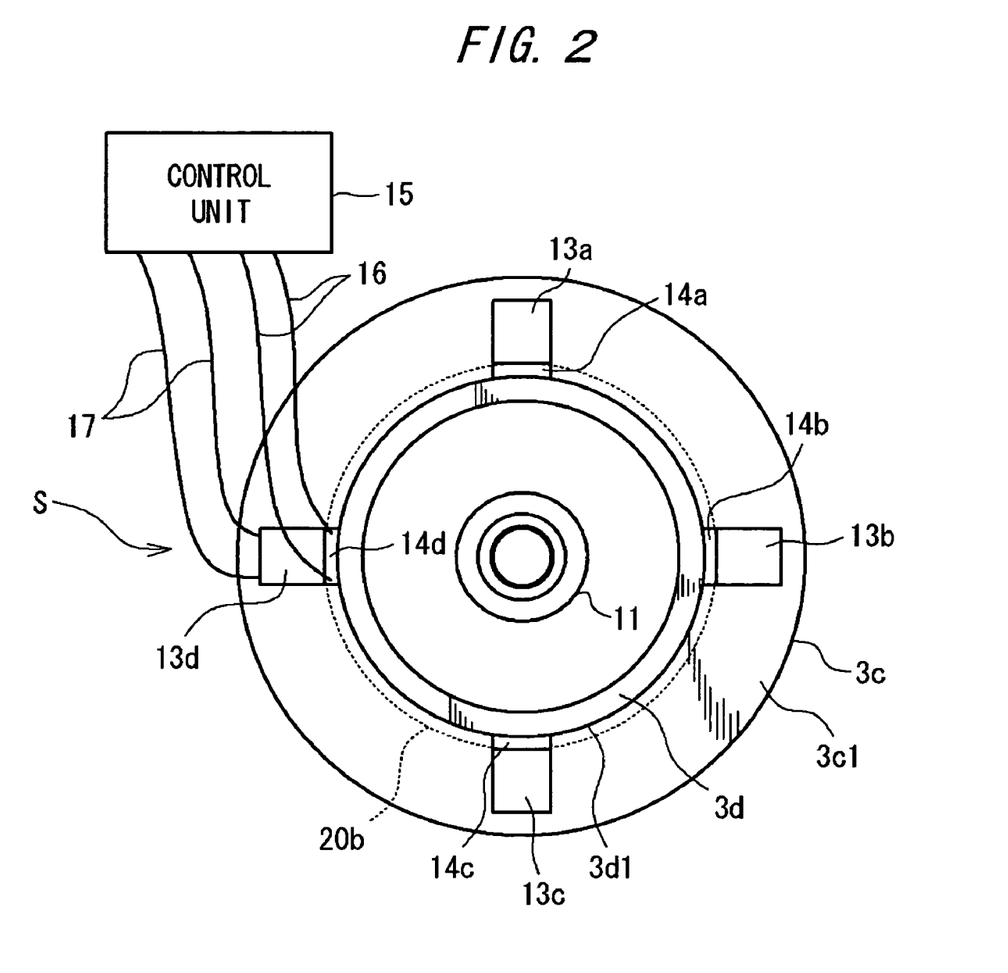
FIG. 2 is an illustration to show an exemplary core of the roller bearing apparatus seen in the arrowed direction A in FIG. 1 when the cover is removed.

Specifically, also with reference to FIG. 2, the sensor device S has four piezoelectric elements $13a$, $13b$, $13c$, and $13d$ interposed between the axial end surface $3c1$ of the flange $3c$ of the outer ring 3 (see FIG. 1) and the axial end surface $20a$ of the knuckle 20 (see FIG. 1) at 90° intervals around the bearing axis. Additionally, it has four piezoelectric elements $14a$, $14b$, $14c$, and $14d$ interposed between the outer periphery $3d1$ of the cylindrical part $3d$ of the outer ring 3 (see FIG. 1) and the inner periphery $20b$ of the knuckle 20 (see FIG. 1) at 90° intervals around the bearing axis. With this structure, when the bearing apparatus 1 is mounted on a vehicle, the piezoelectric elements $13a$, $13c$, $14a$, and $14c$ are arranged vertical relative to the vehicle and the piezoelectric elements $13b$, $13d$, $14b$, and $14d$ are arranged longitudinally relative to the vehicle.

The piezoelectric elements $13a$ to $13d$ and $14a$ to $14d$ are, for example, in the form of a film having a thickness of approximately 20 to 200 μm and supply voltage signals according to the pressure detected by means of piezoelectric effect. Specifically, the piezoelectric elements $13a$ to $13d$ and $14a$ to $14d$ are made of a highly flexible polymer piezoelectric substance such as polyvinylidene fluoride. The piezoelectric elements $13d$ and $14d$ are connected to a control unit 15 via cables 16 and 17, respectively, as shown in FIG. 2. The control unit 15 can be, for example, an ECU mounted in a vehicle and detect the corresponding load components based on voltage signals from the piezoelectric elements 13a to 13d and 14a to 14d.

When the pressure between the axial end surface 3c1 of the flange 3c and the axial end surface 20a of the knuckle 20 is changed, the piezoelectric elements 13a to 13d are subject to changes in electrostatic capacity according to the changed pressure and, accordingly, the voltage signals supplied to the control unit 15 are changed. Then, the control unit 15 compares them with the voltage signals in the stationary state (the initial state when the bearing apparatus 1 is mounted on a vehicle) so as to detect load components in the transverse direction of the vehicle. More specifically, when the vehicle is subject to a transverse G, the difference resulting from subtracting the voltage signal value of the piezoelectric element 13d from the voltage signal value of the piezoelectric element 13b is nearly zero and the difference resulting from subtracting the voltage signal value of the piezoelectric element 13c from the voltage signal value of the piezoelectric element 13a is a value corresponding to the transverse G, but not zero. When a steering operation (for example a K-turn operation) is conducted at a relatively lower vehicle speed, the difference resulting from subtracting the voltage signal value of the piezoelectric element 13d from the voltage signal value of the piezoelectric element 13b is nearly zero and the difference resulting from subtracting the voltage signal value of the piezoelectric element 13c from the voltage signal value of the piezoelectric element 13a is smaller than zero. When a steering operation is conducted at a relatively higher vehicle speed, neither the difference resulting from subtracting the voltage signal value of the piezoelectric element 13d from the voltage signal value of the piezoelectric element 13b or the difference resulting from subtracting the voltage signal value of the piezoelectric element 13c from the voltage signal value of the piezoelectric element 13a is zero.

Similarly, when the pressure between the outer periphery 3d1 of the flange 3c and the inner periphery 20b of the knuckle 20 is changed, the piezoelectric elements 14a to 14d are subject to changes in electrostatic capacity according to the changed pressure and, accordingly, the voltage signal values supplied to the control unit 15 are changed. Then, the control unit 15 compares them with the voltage signal values in the stationary state so as to detect load components in the vertical and longitudinal directions of the vehicle. More specifically, when the vehicle is accelerating, the difference resulting from subtracting the voltage signal value of the piezoelectric element 14d from the voltage signal value of the piezoelectric element 14b is larger than zero according to the magnitude of acceleration. When the vehicle is decelerating, the difference resulting from subtracting the voltage signal value of the piezoelectric element 14d from the voltage signal value of the piezoelectric element 14b is smaller than zero according to the magnitude of deceleration. When the vehicle is running at a fixed speed, the voltage signal values of the piezoelectric elements 14b and 14d are nearly equal and, therefore, the difference is nearly zero. When the vehicle is going uphill, the difference resulting from subtracting the voltage signal value of the piezoelectric element 14c from the voltage signal value of the piezoelectric element 14a is increased and the difference resulting from subtracting the voltage signal value of the piezoelectric element 14d from the voltage signal value of the piezoelectric element 14b becomes larger than zero according to the inclination of the uphill. On the other hand, when the vehicle is going downhill, the difference resulting from subtracting the voltage signal value of the piezoelectric element 14c from the voltage signal value of the piezoelectric element 14a is increased and the difference resulting from subtracting the voltage signal value of the piezoelectric element 14d from the voltage signal value of the piezoelectric element 14b becomes smaller than zero according to the downhill decline.

Using the detected load components, the control unit 15 generates instruction signals to other systems of the vehicle such as the electric power steering, brake, and traction control systems, by which the detected load components are reflected in the vehicle posture control.

In this embodiment having the above structure, the piezoelectric elements 13a to 13d and 14a to 14d interposed between the outer ring (fixed bearing ring) 3 and knuckle (fixing part) 20 detect loads applied to the roller bearing apparatus 2. Unlike the prior art using strain gauges, the loads can be detected highly accurately without providing a bridge circuit and the like. Further, the piezoelectric elements (sensors) that detect loads can be mounted simply by interposing or putting them between the outer ring 3 and the knuckle 20, which are put together in the vehicle assembly process, and are provided in the form of a film. Hence, the installation of the sensors can be significantly simplified in comparison with the aforementioned strain gauges that require a bonding means such as adhesives or formation of recesses, thereby realizing a bearing apparatus that allows for highly accurate load detection using a smaller number of parts and that has a simplified structure. Since the piezoelectric elements are attached to the outer ring 3 or the fixed bearing ring, there is no need of providing a wireless transmitter to send detection results to a control unit and the wiring to a control unit can be easily done in comparison with the case in which the sensors are provided on a rotary bearing ring.

In this embodiment, when the outer ring 3 is fixed to the knuckle 20 and when, the bearing apparatus 1 is used as a vehicle hub unit, the piezoelectric elements 13a to 13d and 14a to 14d supply load components in the transverse, vertical, and longitudinal directions of the vehicle to the control unit 15. Consequently, the control unit 15 can accurately detect the traction between the wheel where the hub unit is provided and the road surface and, accordingly, detects the behavior of the vehicle at each wheel where the bearing apparatus 1 is provided, by which the vehicle posture can be controlled with a high degree of accuracy.

In the above explanation, the present invention is applied to a driven wheel hub unit of a vehicle having a double-row angular ball bearing. However, the present invention is not restricted to the aforementioned embodiment in terms of the bearing manner including the type of rolling elements and the number of installation points as long as piezoelectric film elements are interposed between the fixed bearing ring and the fixing part to be fixed thereto so as to detect load applied between the fixed bearing ring and the fixing part in a roller bearing apparatus comprising a fixed bearing ring, a rotary bearing ring, and rolling elements rollably provided between these bearing rings. Specifically, the present invention can be applied to a roller bearing apparatus constituting a vehicle drive wheel hub unit. Converse to the aforementioned embodiment, the present invention can be also applied to a bearing apparatus installed in a machine or an apparatus such as rotating equipment other than hub units in which the inner and outer rings are used as a fixed bearing ring and a rotary bearing ring, respectively.

In the above explanation, the sensor device includes a total of eight piezoelectric elements that detect the axial and radial loads of the bearing. The sensor device in the present invention is not restricted thereto, and the number and positions of the elements are not restricted to the aforementioned embodiment. For example, the piezoelectric elements can be provided only in the upper part in the radial direction of the bearing in a bearing apparatus that supports rollers in a rolling machine. Then, the detected radial load values are obtained from the sensing results of the elements and erroneous rolling or damaged bearings can be detected based on the detected values obtained. Only the axial (thrust) load of a thrust bearing used in a scroll compressor can be measured in order to detect abnormal operations in the scroll compressor.

In the above explanation, the piezoelectric elements are made of polymer piezoelectric substances. However, the piezoelectric elements of the present invention are not restricted in any way as long as they are in the form of a film that can be interposed between the fixed bearing ring and the fixing part. There can be used piezoelectric elements such as piezoelectric ceramics having a piezoelectric effect and complexes of the piezoelectric ceramics and piezoelectric polymer resins. However, the piezoelectric elements made of the polymer piezoelectric substances described above are preferable because they are more flexible in comparison with other materials, by which they can be easily deformed and attached along the outer periphery contour when they are attached to a non-flat surface, such as to the outer periphery of the outer ring. Further, polymer piezoelectric substances offer excellent workability in shaping in comparison with other materials, by which the piezoelectric elements can be easily processed into any shape according to attaching points. The polymer piezoelectric substances are also preferable in view of having approximately 20 times higher voltage-resistances than piezoelectric ceramics.

Figure 3:
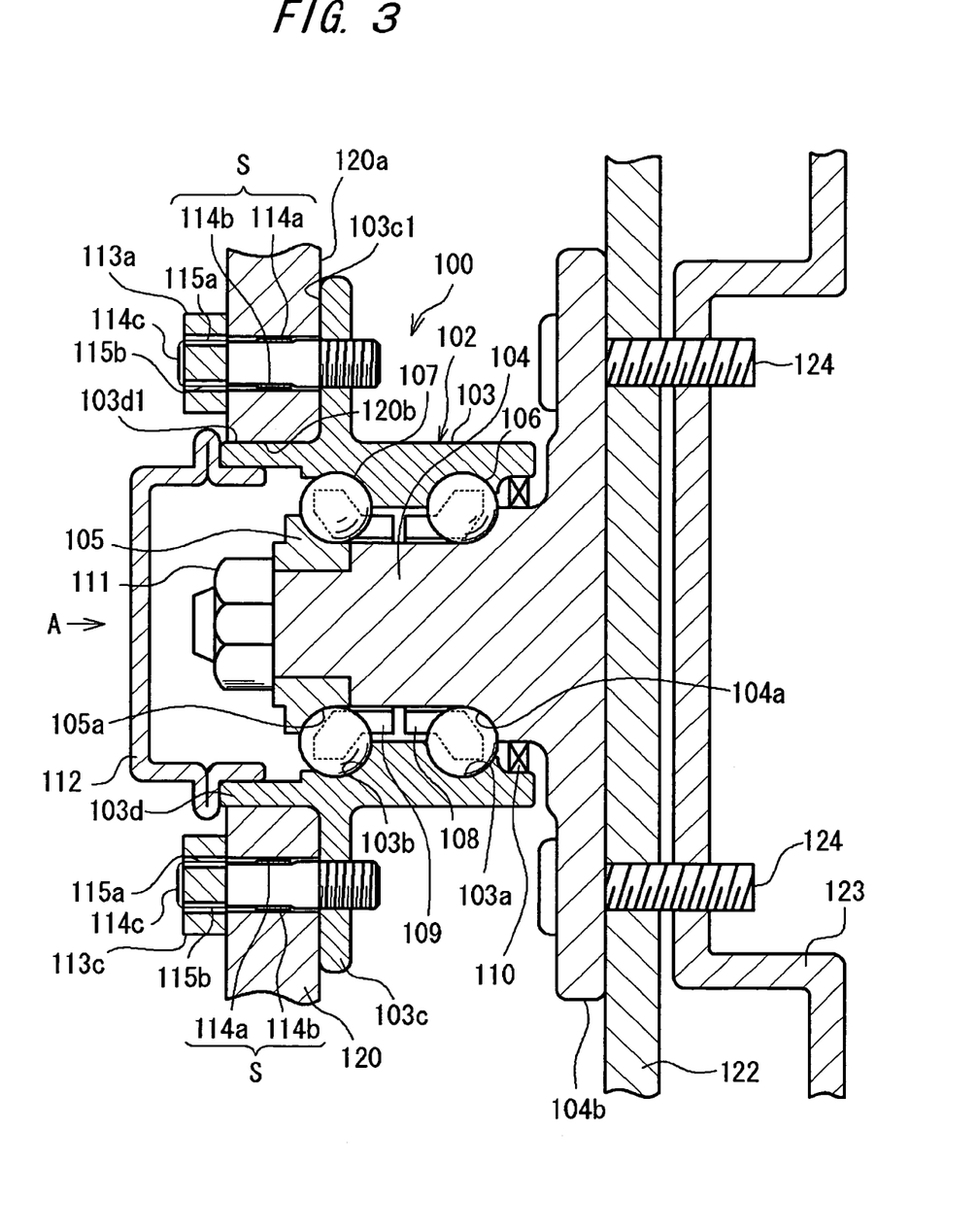
FIG. 3 is a cross-sectional view of an embodiment of the sensor-mounted roller bearing apparatus according to the second aspect of the present invention.
Figure 4:
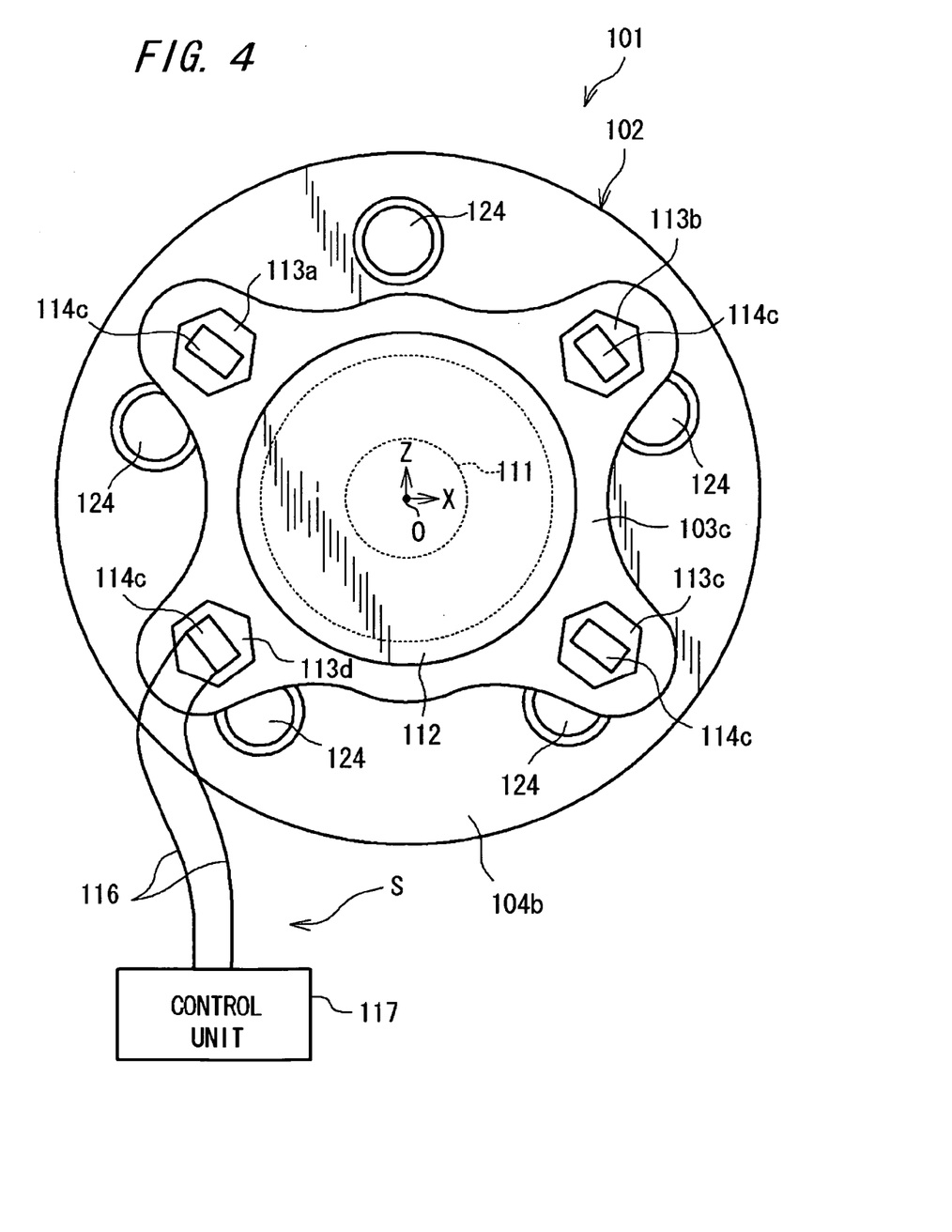
FIG. 4 is an illustration to show an exemplary core of the roller bearing apparatus seen in the arrowed direction A in FIG. 3.

An embodiment of the bearing apparatus according to the second aspect of the present invention is described hereafter. FIG. 3 is a cross-sectional view of an embodiment of the bearing apparatus according to the second aspect of the present invention, and FIG. 4 is an illustration to show an exemplary core of the bearing apparatus seen in the arrowed direction A in FIG. 3. FIG. 3 shows the vehicle outer side (the wheel side) to the right and the vehicle inner side to the left. A bearing apparatus 101 of this embodiment consists of a roller bearing apparatus 102 and a sensor device S. The roller bearing apparatus 102 is of a double-row angular ball bearing type and comprises an outer ring 103, an inner shaft (hub) 104, an inner ring 105, and rolling elements, or multiple balls, 106 and 107. The roller bearing apparatus 102 also comprises cages 108 and 109 that hold the rolling elements 106 and 107 at specified intervals in the circumferential direction, a seal 110 provided in the gap between the outer ring 103 and the inner shaft 104, and a nut 111 screwed in the inner shaft 104.

The outer ring 103 is a fixed bearing ring that is fixed to a vehicle body, having a double row of races 103a and 103b. On the other hand, a rotary bearing ring is formed by the inner shaft 104 and the inner ring 105. A race 104a is formed on the inner shaft 104 at the corresponding point to the race 103a, by which the rolling element 106 rolls between the races 103a and 104a. A race 105a is formed on the inner ring 105 at the corresponding point to the race 103b, by which the rolling element 107 rolls between the races 103b and 105a.

The inner shaft 104 has a flange 104b formed at the vehicle outer side end and on the diametrically outer side. A disc rotor 122 and a wheel 123 included in the brake apparatus of the vehicle are fixed to the flange 104b in this order by bolts 124 pressed in and fixed to the flange 104b.

The inner ring 105 is fixed to the inner shaft 104 by fastening the nut 111 screwed in the inner shaft 104 at the vehicle inner side end.

An annular knuckle 120 as a fixing part included in the suspension (not shown) of the vehicle is fixed to the outer ring 103. The outer ring 103 has a flange 103c formed on the vehicle inner side and on the diametrically outer side and a cylindrical part 103d extended in the axial direction on the vehicle inner side. The outer ring 103 and knuckle 120 are fixed by four fixing bolts 113a, 113b, 113c, and 113d shown in FIG. 4 in a manner in which the axial end surface 103c1 of the flange 103c and the axial end surface 120a of the knuckle 120 are in area contact and the outer periphery 103d1 of the cylindrical part 103d and the inner periphery 120b of the knuckle 120 are in area contact.

Pressed in the inner periphery of the cylindrical part 103d, a cover 112 seals the annular opening between the outer and inner rings of the roller bearing apparatus 102 on the vehicle inner side to prevent rain and foreign substances from entering the inside of the bearing in conjunction with the seal 110 that seals the annular opening on the vehicle outer side.

The fixing bolts 113a to 113d fix the knuckle 120 and the flange 103c of the outer ring 103 at different positions around the bearing axis as shown in FIG. 4. Specifically, in FIG. 4, the directions of the axes X and Z correspond to the longitudinal and vertical directions of the vehicle, respectively. The fixing bolt 113a is, for example, placed to the front and top of the vehicle. The fixing bolt 113a is placed at a point where it forms a specified angle (for example 30°) with the axis X about the shaft axis O (the central angle). The fixing bolt 113a and fixing bolt 113b are placed at point symmetrical positions about the shaft axis O. The fixing bolt 113b and fixing bolt 113d are placed at point symmetrical positions about the shaft axis O. The fixing bolts 113b, 113d and the fixing bolts 113a, 113c are at line symmetrical positions about the axis Z, respectively. The fixing bolts 113b, 113c, and 113d are placed to the back and top, to the back and bottom, and to the front and bottom, respectively. The fixing bolts 113a to 113d are placed at different points around an axis in the transverse direction (the direction orthogonal to the sheet of FIG. 4, which is termed the axis Y direction hereafter) that coincides with the bearing axis to fix the knuckle 120 and flange 103c.

Again with reference to FIG. 3, as a load sensor included in the sensor apparatus S, the fixing bolts 113a to 113d are provided with a pair of strain gauges 114a and 114b detecting strain (elastic deformation) that occurs in the corresponding fixing bolts 113a to 113d. Specifically, for example, the fixing bolt 113a has, on the outer periphery of the bolt shaft inserted in a bolt hole formed in the knuckle 120, two flat areas formed by cutting away the outer periphery of a flat surface. The strain gauges 114a and 114b are respectively attached to the flat areas, so as to clamp the bolt shaft. The threaded part of the fixing bolt 113a is screwed in the threaded hole formed in the flange 103c. When a load is applied between the outer ring (the roller bearing apparatus 102) and the knuckle 120, the fixing bolt 113a is distorted according to the load and the distortion is detected by the strain gauges 114a and 114b.

Signal lines 115a and 115b are connected to the strain gauges 114a and 114b, respectively. The signal lines 115a and 115b are extended to the outside of the fixing bolt 113a via through-holes formed in the bolt head of the fixing bolt 113a and connected to a relay terminal plate 114c provided at the bolt head. As shown in FIG. 4, cables 116 are connected to the terminal plate 114c. Detected signals from the strain gauges 114a and 114b are supplied to a control unit 117 via the cables 116. The control unit 117 can be, for example, an ECU mounted in the vehicle and constructed to detect the corresponding load components based on the detected signals from the strain gauges 114a and 114b provided at each of the fixing bolts 113a to 113d.

Figure 5A:
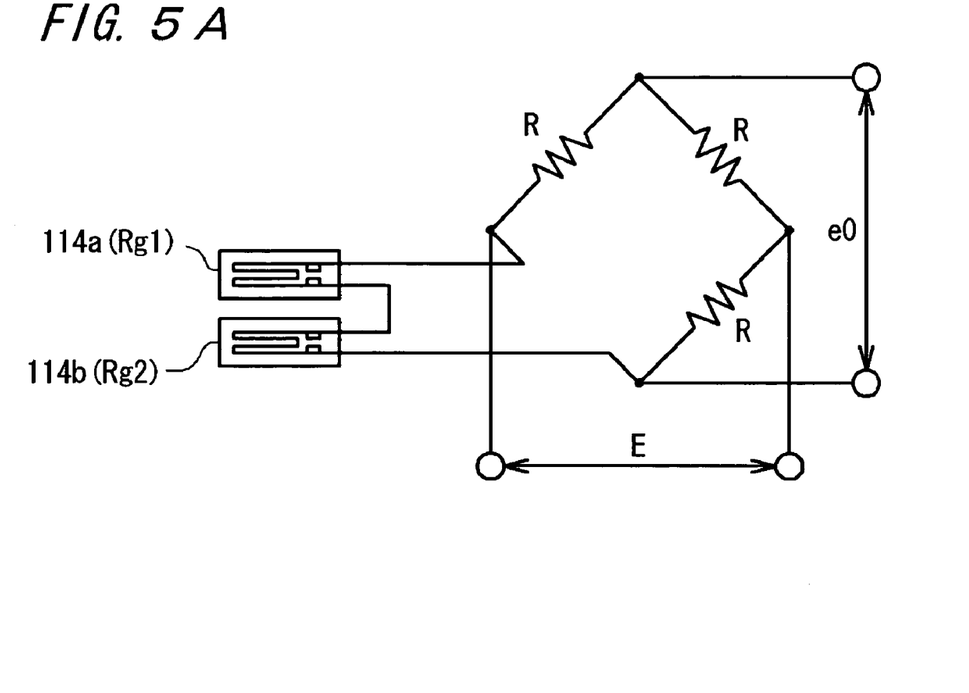
FIG. 5A is a circuit diagram to show an exemplary connection of strain gauges shown in FIG. 3.

Specifically, the control unit 117 comprises a bridge circuit shown in FIG. 5A provided for each of the fixing bolts 113a to 113d. In the control unit 117, the pair of strain gauges 114a and 114b is connected to one arm of the bridge circuit with the strain gauges 114a and 114b being connected to each other in series so that of the flexural component and the tensile component of the detected distortion (load), the flexural component is canceled and only the tensile component is detected. When resistance Rg1 and Rg2 of the strain gauges 114a and 114b are changed according to the load, the control unit 117 measures the output voltage e0 of the bridge circuit, calculates a distortion ϵ0 using the equation (1) below, and obtains a detected value (tensile component) of the load one of the corresponding fixing bolts 113a to 113d based on the calculated distortion ϵ0.

$$e0=(E/4)\cdot KS\cdot \epsilon 0 \quad (1)$$

E and KS in the equation (1) denote an input voltage and a gauge factor of the bridge circuit, respectively.

Subsequently, the control unit 117 determines directional load components in the longitudinal, vertical, and transverse directions of the vehicle using four detected load values obtained from a pair of strain gauges 114a and 114b provided at each of the fixing bolts 113a to 113d. The control unit 117 is constructed to generate instruction signals sent to other systems of the vehicle such as the power steering, brake, and traction control systems using directional load components in the longitudinal, vertical, and transverse directions of the vehicle, by which the obtained directional load components are reflected in the vehicle posture control.

Specifically, actual changes in detected load values when loads are applied in the longitudinal, vertical, and transverse directions of the vehicle are as shown in Tables 1, 2, and 3. The signs "+" and "−" in the tables result from comparison with values before the change and indicate that the corresponding strain gauges (fixing bolt) are extended and contracted, respectively, when the load shown at the top of each column is applied. As shown in Table 3, it can be determined in detecting loads in the transverse direction of the vehicle whether the load is applied in the inward or outward direction of the vehicle by comparing the detected values from the load sensors attached to two fixing bolts attached to the top or to the bottom of the vehicle.

TABLE 1

| | | upward load | downward load |
|---|---|---|---|
| Positions of strain gauges 14a and 14b (load sensor) | fixing bolt 13a | − | + |
| | fixing bolt 13b | − | + |
| | fixing bolt 13c | + | − |
| | fixing bolt 13d | + | − |

TABLE 2

| | | forward load | backward load |
|---|---|---|---|
| Positions of strain gauges 14a and 14b (load sensor) | fixing bolt 13a | − | + |
| | fixing bolt 13b | + | − |
| | fixing bolt 13c | + | − |
| | fixing bolt 13d | − | + |

TABLE 3

| | | vehicle inward load | vehicle outward load |
|---|---|---|---|
| Positions of strain gauges 14a and 14b (load sensor) | fixing bolt 13a | −(small) | +(large) |
| | fixing bolt 13b | −(large) | +(small) |
| | fixing bolt 13c | +(small) | −(large) |
| | fixing bolt 13d | +(large) | −(small) |

The control unit 117 obtains directional load components in the longitudinal and vertical directions of the vehicle by dividing the corresponding detected load value into directional components in the axes X and Z directions using the positional information of the pair of strain gauges 114a and 114b (the load sensors), or the central angle of each of the fixing bolts 113a to 113d about the shaft axis O, and performing specific mathematical operations on the four directional components in the axis X direction and on the four directional components in the axis Z direction. The control unit 117 further obtains directional load components in the transverse direction of the vehicle, for example, by calculating the difference in the detected load values of the strain gauges 114a and 114b attached to the fixing bolts 113a and 113b that are provided at the top of the vehicle to determine directional components in the axis Y direction.

Then, the control unit 117 generates instruction signals to other systems based on the obtained directional load components also using the signal form of the output voltage e0, or the signal form of the detected signals from the strain gauges 114a and 114b while identifying the running conditions of the vehicle. Specifically, when the detected load values fluctuate in a vibrating manner, the control unit 117 assumes that the wheels are subject to vertical undulation because the vehicle is running on a rough road surface and, then, changes the steering properties of the power steering system and the like based on the assumed road surface condition and the directional load components. When an abrupt change is detected, followed by a large value lasting for longer than a pre-determined duration, the control unit 117 assumes that a brake operation has caused locking or skidding and, then, changes the brake force of the brake system and the like.

In an embodiment having the structure above, a pair of strain gauges (load sensors) 114a and 114b provided at each of the fixing bolts (fixing means) 113a to 113d that fix the outer ring (fixed bearing ring) 103 and knuckle (fixing part) 120 is used to detect loads applied to the roller bearing apparatus 102. Unlike the prior art, the loads can be highly accurately detected without providing a wireless transmitter and the like. When the outer ring 103 and knuckle 120 are fixed by the fixing bolts 113a to 113d in the course of assembly of a vehicle, the strain gauges 114a and 114b for detecting loads are installed in the vehicle, thereby significantly simplifying the installation of the load sensors. Consequently, a bearing apparatus that allows for highly accurate load detection using a smaller number of parts in a simplified structure and for simplified sensor installation is realized. Further, directional load components in the longitudinal, vertical, and transverse directions are easily detected because the load sensors are provided in fixed positions, enabling the vehicle posture to be easily controlled. The strain gauges 114a and 114d are located away from the disc rotor 122 that easily generates heat in association with the brake operation and are provided in the bolt holes of the knuckle 120, so that they are subject to less temperature drift in comparison with the prior art in which the strain gauges are provided close to the disc rotor. Therefore, the load detection accuracy can be easily improved with the influence of temperature drift being reduced as much as possible.

In this embodiment, when the outer ring 103 is fixed to the knuckle 120 and, the bearing apparatus 101 is used as a vehicle hub unit, four pairs of strain gauges 114a and 114b provided at different positions around the wheel axle are used for the control unit 117 to detect directional load components in the longitudinal, vertical, and transverse directions of the vehicle. In this way, the control unit 117 can highly accurately detect the traction between the wheel where the hub unit is provided and the road surface and, accordingly, detect the behavior of the vehicle at each wheel where the bearing apparatus 101 is provided, by which the vehicle posture can be controlled with high accuracy.

In this embodiment, of the flexural and tensile components of a distortion detected by the pair of gauges 114 and 114b, the flexural component is canceled and the tensile component is emphasized and extracted. Consequently, highly accurate load detection can be easily achieved even when the fixing bolts 113a to 113d are subject to very small distortion.

Figure 5B:
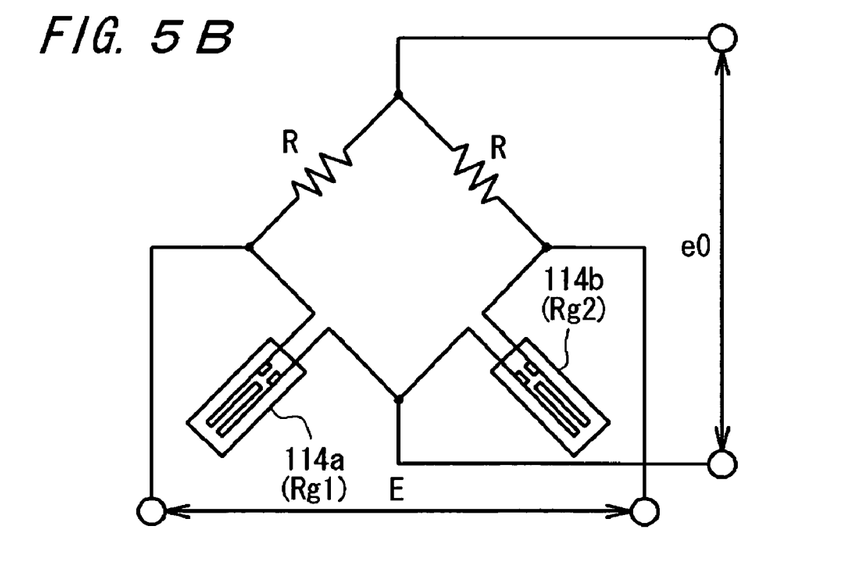
FIG. 5B is a circuit diagram to show another exemplary connection of the strain gauges.

In the above explanation, two strain gauges 114a and 114 are provided to each of the fixing bolts 113a to 113d and only the tensile component is detected. However, the number of strain gauges and the structure of the bridge circuit in the sensor apparatus S of the present invention are not restricted thereto. For example, as shown in FIG. 5B, the strain gauges 114a and 114b connected to each other in series can be connected in adjacent arms of the bridge circuit, by which each of the tensile components detected by the strain gauges 114 and 114b are canceled and the flexural component is emphasized and extracted, enabling the flexural components to be used to highly accurately detect very small distortion (load). When the bridge circuit shown in FIG. 5B is used, the control unit 117 calculates a distortion $\epsilon 0$ using equation (2) below for detecting a load. Because the strain gauges 114a and 114b are connected in the adjacent arms of the bridge circuit, temperature drifts are automatically canceled and the structure of a temperature compensation circuit can be simplified. When only the flexural components are extracted, it is preferable that the strain gauges 114a and 114b be attached to the flat areas of the fixing bolt 113a with a gap to the inner periphery of the bolt holes so that they are not in contact with the inner periphery. Here, the tensile components tend to more easily occur than the flexural components where strain gauges are attached to the flat areas of a fixing bolt as in this embodiment. Therefore, it is preferable in view of detecting loads in high resolution that only the tensile components be extracted using the bridge circuit shown in FIG. 5A.

$$e0 = (E/2) \cdot KS \cdot \epsilon 0 \quad (2)$$

Figure 6:
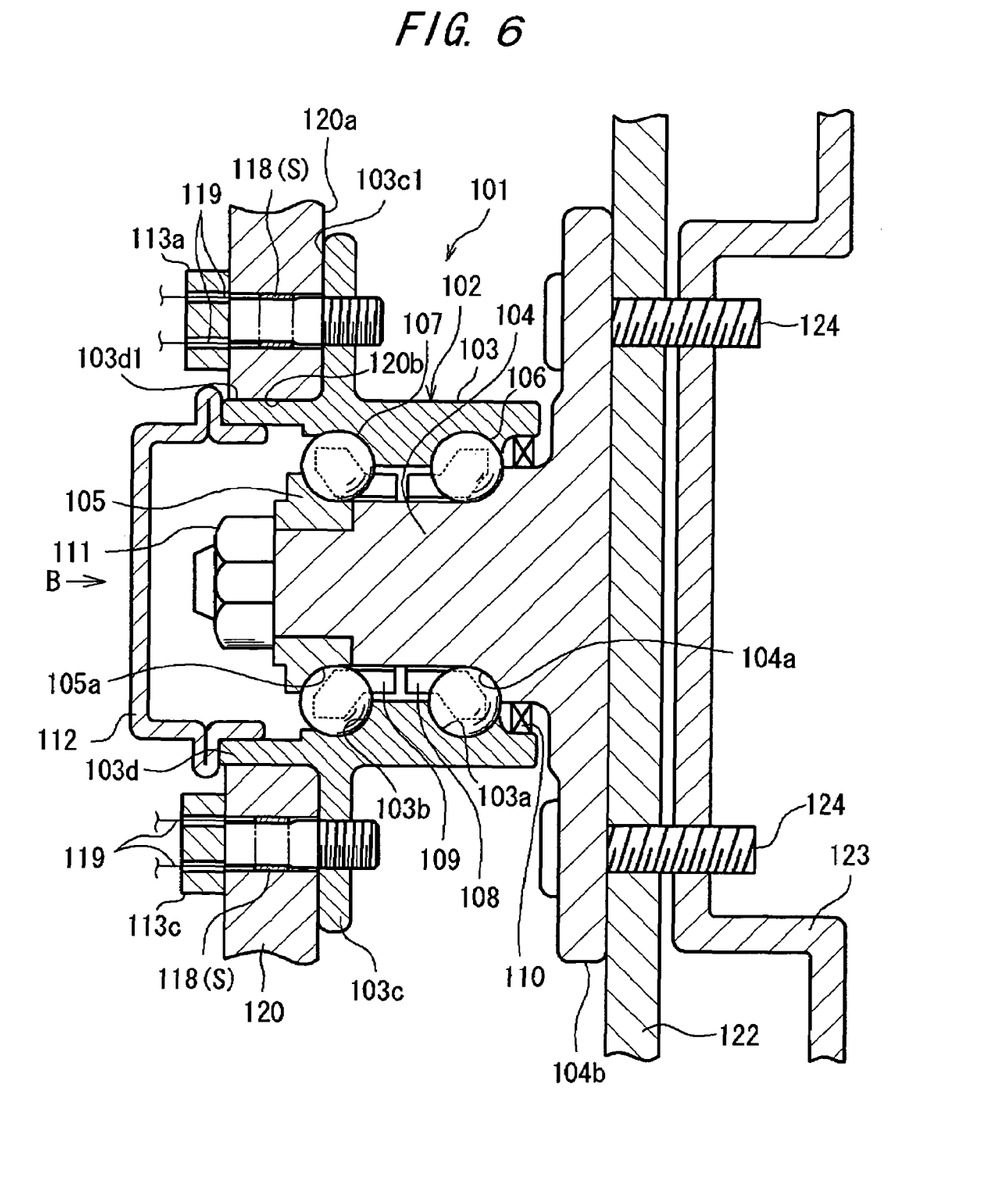
FIG. 6 is a cross-sectional view of another embodiment of the sensor-mounted roller bearing apparatus according to the second aspect of the present invention.
Figure 7:
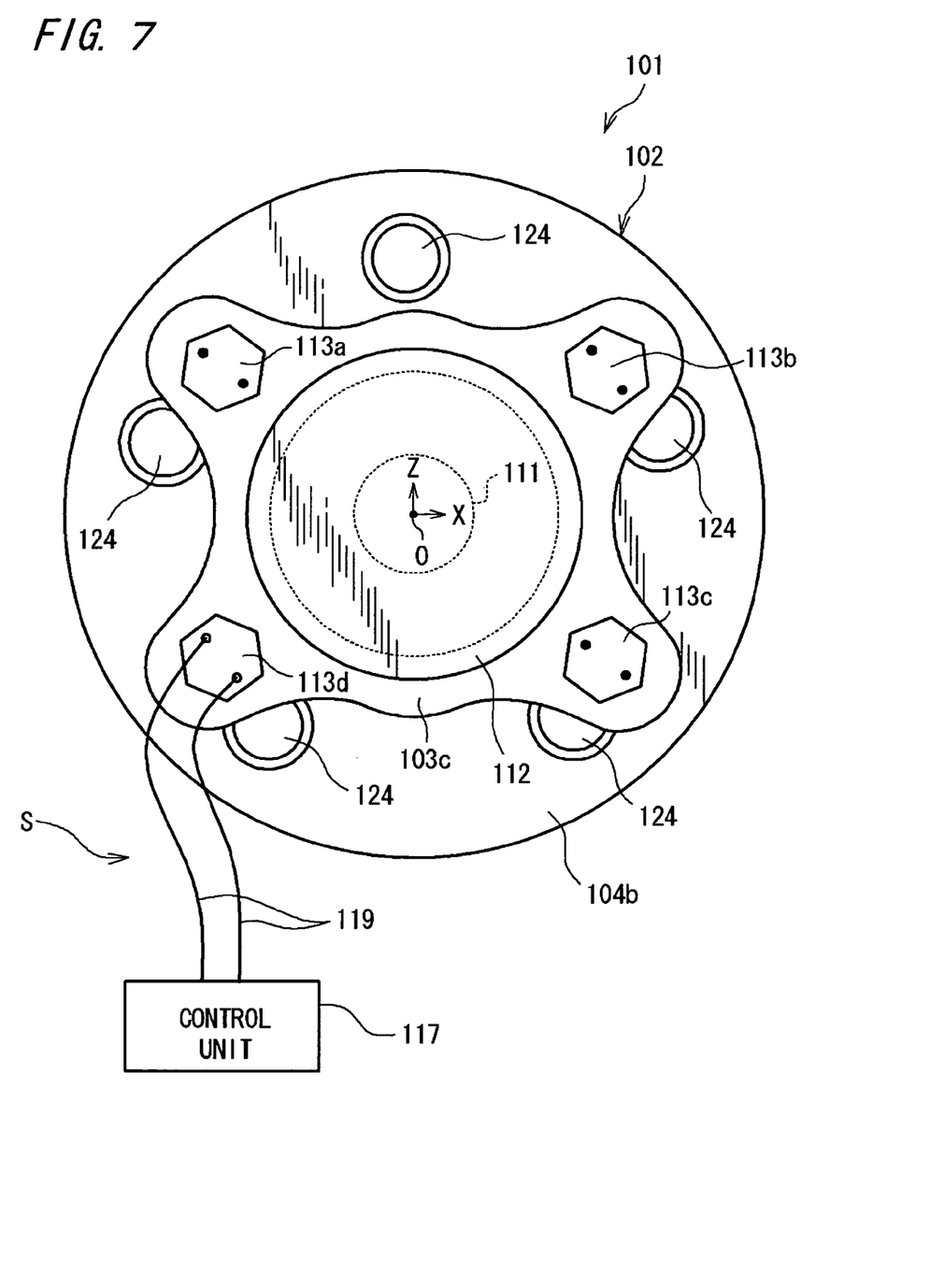
FIG. 7 is an illustration to show an exemplary core of the roller bearing apparatus seen in the arrowed direction B in FIG. 6.

FIG. 6 is a cross-sectional view of another embodiment of the bearing apparatus according to the second aspect of the present invention. FIG. 7 is an illustration to show an exemplary core of the bearing apparatus seen from the arrow direction B in FIG. 6. In the figures, the major difference between this embodiment and the aforementioned embodiment is that a piezoelectric element is used as a load sensor in place of a pair of strain gauges.

As shown in FIG. 6, for example, a piezoelectric element 118 is wound as a load sensor on the outer periphery of the bolt shaft of a fixing bolt 113a. The piezoelectric element 118 is, for example, in the form of a film having a thickness of approximately 20 to 100 μm and outputs voltage signals depending on the pressure detected by means of the piezoelectric effect. Specifically, the piezoelectric element 118 is made of a highly flexible polymer piezoelectric substance such as polyvinylidene fluoride and attached to the outer periphery of the bolt shaft in the manner in which it is interposed between the fixing bolt 113a and the knuckle 120 when the fixing bolt 113a fixes the outer ring 103 and knuckle 120.

Cables 119 are connected to the piezoelectric element 118 as shown in FIG. 6. The cables 119 are extended outside of the fixing bolt 113a via through-holes formed in the bolt head. Then, as shown in FIG. 7, the cables 119 are directly connected to the control unit 117, by which signals from the piezoelectric elements 118 are supplied to the control unit 117.

As in the aforementioned embodiment, the control unit 117 is constructed to detect the corresponding load components based on voltage signals from the piezoelectric element 118 provided at each of the four fixing bolts 113a to 113d.

When a load is applied between the outer ring 103 (the roller bearing apparatus 102) and the knuckle 120 and the pressure between the corresponding fixing bolt and the knuckle 120 is accordingly changed, each piezoelectric element 118 is subject to changes in electrostatic capacity according to the changed pressure and voltage signal values to the control unit 117 are changed. The control unit 117 compares them with the voltage signal values in the stationary state (at the initial state when the bearing apparatus 1 is mounted in the vehicle) and detects the corresponding load components for each piezoelectric element 118 provided at each of the fixing bolts 113a to 113d. The control unit 117 further obtains directional load components in the longitudinal, vertical, and transverse directions using the four detected load values obtained from the four piezoelectric elements 118 and reflects them in the vehicle posture as in the aforementioned embodiment.

With the above structure, the piezoelectric elements 118 wound on the fixing bolts 113a to 113d detect loads applied to the roller bearing apparatus 2 in this embodiment. The loads can be detected with high accuracy without providing a wireless transmitter and the like as in the aforementioned embodiment. In this embodiment, the loads are directly detected by means of piezoelectric effect of the piezoelectric elements 118. Therefore, the number of parts in the bearing apparatus 101 can be further reduced and the apparatus structure can be further simplified in comparison with an embodiment that requires bridge circuits.

In the explanation of this embodiment, a piezoelectric element 118 is wound on the outer periphery of the bolt shaft of each of the fixing bolts 113a to 113d in a manner such that it is interposed between each of the fixing bolts 113a to 113d and the knuckle 120. However, the number and mounting method of the piezoelectric elements in the sensor device S of the present invention is not restricted thereto. For example, a slit parallel with the axis Z may be formed in the outer periphery of the bolt shaft of each of the fixing bolts and a piezoelectric element installed in the slit, by which directional load components in the axes X and Y directions are detected.

In the explanation of this embodiment, the piezoelectric elements are made of polymer piezoelectric substances. However, the piezoelectric elements in the present invention are not restricted in any way as long as they are in the form of a film that can be interposed between the fixed bearing ring and the fixing part. There can be used piezoelectric elements such as piezoelectric ceramics having a piezoelectric effect and complexes of the piezoelectric ceramics and piezoelectric polymer resins. However, the piezoelectric elements made of polymer piezoelectric substances as described above are preferable because they are more flexible in comparison with other materials, by which they can be easily deformed and attached along the outer periphery contour when they are attached to a non-flat surface, for example, to the outer periphery of the outer ring. Further, polymer piezoelectric substances offer excellent workability in shaping in comparison with other materials, by which the piezoelectric elements can be easily processed into any shape according to attaching points. The polymer piezoelectric substances are preferable also in view of having approximately 20 times higher voltage-resistance than do piezoelectric ceramics.

In the explanation of the embodiment shown in FIGS. 3 to 7, the present invention is applied to a driven wheel hub unit of a vehicle having a double-row angular ball bearing. However, the present invention is not restricted to the aforementioned embodiment in terms of the bearing manner including the type of rolling elements and the number of installation points as long as load sensors are provided on a fixing means that fixes the fixed bearing ring and a fixing part to be fixed thereto and the load sensors are used to detect loads between the fixed bearing ring and the fixing part in a roller bearing apparatus comprising a fixed bearing ring, a rotary bearing ring, and rolling elements rollably provided between the bearing rings. Specifically, the present invention can be applied to a roller bearing apparatus constituting a vehicle drive wheel hub unit. Converse to the aforementioned embodiment, the present invention can be also applied to a bearing apparatus installed in a machine or an apparatus such as rotating equipment other than hub units in which the inner and outer rings are used as a fixed bearing ring and a rotary bearing ring, respectively.

In the above explanation, the load sensors are provided on the fixing bolts as hub bolts that fix the outer ring (fixed bearing ring) to the knuckle of a vehicle. However, the fixing means of the present invention is not restricted thereto. For example, a washer can be provided between the fixing bolt and the knuckle, in which strain gauges are attached to the surface of the washer or a piezoelectric element is interposed between the washer and the knuckle.

In the above explanation, through-holes are formed in the bolt head of the fixing bolts to extend signal lines and the like to the outside. Grooves can be formed on the surface of the bolt head to extend signals lines and the like to the outside.

In the above explanation, the load sensors are provided on four fixing bolts. However, the sensor apparatus in the present invention is not restricted thereto. The number and positions of load sensors and fixing means are not restricted in any way. However, as described above, it is preferable that they be provided at specified positions different from each other around the bearing axis in order to detect directional load components in the axes X, Y, and Z directions.

What is claimed is:

1. A sensor-mounted roller bearing apparatus including a bearing having a fixed bearing ring attached to a fixing part, a rotary bearing ring, and rolling elements rollably provided between said bearing rings, wherein the apparatus comprises piezoelectric elements in the form of a film interposed between said fixed bearing ring and said fixing part so as to detect loads applied between said fixed bearing ring and said fixing part, and
wherein said piezoelectric elements are interposed between said fixing part and an outer periphery of said fixed bearing ring and between said fixing part and a flange integrally formed on an outer periphery of said fixed bearing ring to detect both axial loads applied in the axial direction of said bearing and radial loads applied in the radial direction of said bearing, and the fixing part and the fixed bearing ring with the integrally formed flange are separate members from each other.

2. The sensor-mounted roller bearing apparatus according to claim 1, wherein said fixed bearing ring consists of an outer ring having a flange that is fixed to an annular knuckle included in a suspension of a vehicle; wherein four of said piezoelectric elements are interposed between the axial end surface of said outer ring flange and the axial end surface of said knuckle at intervals of 90° around the axis of said bearing to detect axial loads applied in the axial direction of said bearing; wherein four of said piezoelectric elements are interposed between the outer periphery of said outer ring and the inner periphery of said knuckle at intervals of 90° around the axis of said bearing to detect radial loads applied in the radial direction of said bearing.

3. A sensor-mounted roller bearing apparatus including a bearing having a fixed bearing ring, a rotary bearing ring, and rolling elements rollably provided between said bearing rings, wherein load sensors that detect loads applied between said fixed bearing ring and a fixing part to which said fixed bearing ring is fixed are provided on a fixing means that fixes said fixed bearing ring and said fixing part,
wherein the fixing means extends through a through hole formed in said fixing part and said load sensors are disposed within said through hole, and
wherein said load sensors are piezoelectric elements that are built into said fixing means or attached to the surface of said fixing means in a manner in which they are interposed between said fixing means and said fixing part and supply signals according to the load.

4. The sensor-mounted roller bearing apparatus according to claim 3, wherein said load sensors consist of two strain gauges connected to each other in series so that said load sensors detect strain generated in said fixing means depending on said load and of flexural and tensile strain components, one strain component is canceled and only the other strain component is detected.

5. The sensor-mounted roller bearing apparatus according to claim 4, wherein said fixed bearing ring consists of an outer ring having a flange that is fixed to an annular knuckle included in a suspension of a vehicle; and said fixing means consists of multiple fixing bolts that fix said knuckle and said flange at pre-determined positions different from each other around the axis of said bearing, respectively.

6. The sensor-mounted roller bearing apparatus according to claim 3, wherein said fixed bearing ring consists of an outer ring having a flange that is fixed to an annular knuckle included in a suspension of a vehicle; and said fixing means consists of multiple fixing bolts that fix said knuckle and said flange at pre-determined positions different from each other around the axis of said bearing, respectively.

7. The sensor-mounted roller bearing apparatus according to claim 3, wherein said fixed bearing ring consists of an outer ring having a flange that is fixed to an annular knuckle included in a suspension of a vehicle; and said fixing means consists of multiple fixing bolts that fix said knuckle and said flange at pre-determined positions different from each other around the axis of said bearing, respectively.

8. The sensor-mounted roller bearing apparatus according to claim 3, wherein said fixing means extends completely through said though hole.

9. The sensor-mounted roller bearing apparatus according to claim 3, wherein said through hole extends completely through said fixing part.

10. A sensor-mounted roller bearing apparatus including a bearing having a fixed bearing ring attached to a fixing part and a space formed therebetween, a rotary bearing ring, and rolling elements rollably provided between said bearing rings, wherein the apparatus comprises piezoelectric elements in the form of a film interposed in the space formed between said fixed bearing ring and said fixing part so as to detect loads applied between said fixed bearing ring and said fixing part, and     wherein the space in which the film is located is between said fixing part and an outer periphery of said fixed bearing ring and between said fixing part and a flange integrally formed on an outer periphery of said fixed bearing ring and wherein said piezoelectric elements detect both axial loads applied in the axial direction of said bearing and radial loads applied in the radial direction of said bearing, and the fixing part and the fixed bearing ring with the integrally formed flange are separate members from each other.

11. A sensor-mounted roller bearing apparatus including a bearing having a fixed bearing ring, a rotary bearing ring, and rolling elements rollably provided between said bearing rings, wherein load sensors that detect loads applied between said fixed bearing ring and a fixing part to which said fixed bearing ring is fixed are provided on a fixing means that fixes said fixed bearing ring and said fixing part,     wherein the fixing means extends through a through hole formed in said fixing part and said load sensors are disposed around the fixing means and are disposed within said through hole, and     wherein the fixing means extends through a hole formed in said fixing part and said load sensors are disposed within said through hole for detecting directional load components in the longitudinal, vertical and transverse directions of a vehicle, respectively.

12. A sensor-mounted roller bearing apparatus including a bearing having a fixed bearing ring, a rotary bearing ring, and rolling elements rollably provided between said bearing rings, wherein the apparatus comprises piezoelectric elements in the form of a film interposed between said fixed bearing ring and a fixing part to which said fixed bearing ring is fixed so as to detect loads applied between said fixed bearing ring and said fixing part, and     wherein said piezoelectric elements are interposed between said fixing part and an outer periphery of said fixed bearing ring and between said fixing part and a flange integrally formed on an outer periphery of said fixed bearing ring to detect individually axial load components applied in the axial direction of said bearing and radial load components applied in the radial direction of said bearing, and the fixing part and the fixed bearing ring with the integrally formed flange are separate members from each other.

13. A sensor-mounted roller bearing apparatus including a bearing having a fixed bearing ring, a rotary bearing ring, and rolling elements rollably provided between said bearing rings, wherein load sensors that detect loads applied between said fixed bearing ring and a fixing part to which said fixed bearing ring is fixed are provided on a fixing means that fixes said fixed bearing ring and said fixing part, and     wherein the fixing means extends through a through hole formed in said fixing part and said load sensors are disposed within said through hole for detecting directional load components in the longitudinal, vertical and transverse directions of a vehicle, respectively.

14. A sensor-mounted roller bearing apparatus including a bearing having a fixed bearing ring, a rotary bearing ring, and rolling elements rollably provided between said bearing rings, wherein load sensors that detect loads applied between said fixed bearing ring and a fixing part to which said fixed bearing ring is fixed are provided on a fixing means that fixes said fixed bearing ring and said fixing part,     wherein the fixing means extends through a through hole formed in said fixing part and said load sensors are disposed within said through hole, and     wherein said fixed bearing ring comprises a flange formed on the vehicle inner side and on the diametrically outer side, and a cylindrical part axially extended on the vehicle inner side and integrally formed with said flange, wherein an annular knuckle as said fixing part included in a vehicle suspension is fixed to said flange and cylindrical part, and wherein said piezoelectric elements are interposed between said knuckle and said flange and between said knuckle and said cylindrical part.

15. A sensor-mounted roller bearing apparatus including a bearing having a fixed bearing ring, a rotary bearing ring, and rolling elements rollably provided between said bearing rings, wherein load sensors that detect loads applied between said fixed bearing ring and a fixing part to which said fixed bearing ring is fixed are provided on a fixing means that fixes said fixed bearing ring and said fixing part,     wherein the fixing means extends through a through hole formed in said fixing part and said load sensors are disposed within said through hole, and     wherein said fixed bearing ring comprises a flange formed on the vehicle inner side and on the diametrically outer side, and a cylindrical part axially extended on the vehicle inner side and integrally formed with said flange, wherein a bolt as said fixing means is inserted into said through hole in a manner in which an axial end surface of said flange, and an axial end surface of an annular knuckle as said fixing part included in a vehicle suspension are in area contact, and the outer periphery of said cylindrical part and the inner periphery of said knuckle are in area contact.

16. The sensor-mounted roller bearing apparatus according to claim 15, wherein on the outer periphery of a bolt shaft inserted in said through hole formed in said knuckle, two flat areas are formed on the bolt shaft by cutting away the outer periphery of a flat surface, and wherein a pair of piezoelectric elements are respectively attached to the flat areas, so as to clamp said bolt shaft.

17. A sensor-mounted roller bearing apparatus including a bearing having a fixed bearing ring, a rotary bearing ring, and rolling elements rollably provided between said bearing rings, wherein load sensors that detect loads applied between said fixed bearing ring and a fixing part to which said fixed bearing ring is fixed are provided on a fixing means that fixes said fixed bearing ring and said fixing part,     wherein the fixing means extends through a through hole formed in said fixing part and said load sensors are disposed within said through hole, and     wherein piezoelectric elements are interposed directly between an outer surface of said fixed bearing and an innermost surface of said fixing part.

\* \* \* \* \*